United States Patent
Amada et al.

(10) Patent No.: US 12,493,675 B2
(45) Date of Patent: Dec. 9, 2025

(54) INFORMATION PROCESSING DEVICE, INFORMATION PROCESSING METHOD, AND RECORDING MEDIUM

(71) Applicant: NEC Corporation, Tokyo (JP)

(72) Inventors: Takuma Amada, Tokyo (JP); Seng pei Liew, Tokyo (JP)

(73) Assignee: NEC CORPORATION, Tokyo (JP)

( * ) Notice: Subject to any disclaimer, the term of this patent is extended or adjusted under 35 U.S.C. 154(b) by 166 days.

(21) Appl. No.: 18/030,585

(22) PCT Filed: Oct. 16, 2020

(86) PCT No.: PCT/JP2020/039108
§ 371 (c)(1),
(2) Date: Apr. 6, 2023

(87) PCT Pub. No.: WO2022/079901
PCT Pub. Date: Apr. 21, 2022

(65) Prior Publication Data
US 2023/0401301 A1  Dec. 14, 2023

(51) Int. Cl.
*G06F 21/32* (2013.01)
*G06N 20/00* (2019.01)

(52) U.S. Cl.
CPC ............ *G06F 21/32* (2013.01); *G06N 20/00* (2019.01)

(58) Field of Classification Search
CPC ....................................................... G06F 21/32
See application file for complete search history.

(56) References Cited

U.S. PATENT DOCUMENTS

| | | | |
|---|---|---|---|
| 2018/0165554 A1* | 6/2018 | Zhang | G06N 3/045 |
| 2019/0238568 A1* | 8/2019 | Goswami | G06F 21/566 |
| 2019/0303720 A1* | 10/2019 | Karam | G06V 10/7715 |
| 2019/0354787 A1* | 11/2019 | Fong | G06V 10/454 |
| 2019/0354847 A1* | 11/2019 | Rasch | G06N 3/045 |
| 2020/0026996 A1* | 1/2020 | Kolter | G06N 3/047 |
| 2020/0159924 A1* | 5/2020 | Tran | G06F 21/566 |
| 2020/0175176 A1* | 6/2020 | Fischer | G06N 3/08 |
| 2020/0184053 A1* | 6/2020 | Kursun | G06V 10/764 |
| 2020/0410082 A1* | 12/2020 | Sharieh | G06F 16/54 |
| 2020/0410335 A1* | 12/2020 | Gu | G06V 10/776 |
| 2021/0049505 A1* | 2/2021 | Wang | G06N 20/00 |
| 2021/0056404 A1* | 2/2021 | Goswami | G06F 18/22 |
| 2021/0152549 A1* | 5/2021 | Wu | H04W 12/06 |
| 2021/0157911 A1* | 5/2021 | Yu | G06N 3/08 |
| 2021/0192357 A1* | 6/2021 | Sinha | G06N 3/088 |
| 2021/0279528 A1* | 9/2021 | Sachdeva | G06F 18/2148 |
| 2021/0300433 A1* | 9/2021 | Vorobeychik | G06F 18/24 |
| 2021/0383274 A1 | 12/2021 | Takahashi et al. | |

(Continued)

FOREIGN PATENT DOCUMENTS

WO  2020/084683 A1  4/2020

OTHER PUBLICATIONS

International Search Report for PCT Application No. PCT/JP2020/039108, mailed on Dec. 8, 2020.

(Continued)

*Primary Examiner* — Khang Do

(57) ABSTRACT

An information processing acquires biometric information of a plurality of persons. The information processing generates one adversarial example, using the biometric information of the plurality of persons.

5 Claims, 7 Drawing Sheets

(56) References Cited

U.S. PATENT DOCUMENTS

2022/0053005 A1* 2/2022 Liu .................. G06F 18/22
2022/0130019 A1* 4/2022 Jeong ................ G06F 21/32

OTHER PUBLICATIONS

Moosavi-Dezfooli, Seyed-Mohsen et al., "Universal advesarial perturbations", arVive [online], v3, Mar. 9, 2017 [retrieval date Oct. 26, 2020].

Kakizaki, Kazuya et al., "Methods of generating adversarial examples for human verification using feature extractor", DEIM Forum 2019 A2-1, The 11th forum on data engineering and information management (The 17th annual conference of the Database Society of Japan), Mar. 4, 2019.

* cited by examiner

INFORMATION PROCESSING DEVICE, INFORMATION PROCESSING METHOD, AND RECORDING MEDIUM

This application is a National Stage Entry of PCT/JP2020/039108 filed on Oct. 16, 2020, the contents of all of which are incorporated herein by reference, in their entirety.

TECHNICAL FIELD

The present invention relates to an information processing device, an information processing method, and a recording medium.

BACKGROUND ART

Adversarial examples are known as one of the vulnerabilities of models obtained by machine learning (for example, see Patent Document 1). Adversarial examples are samples that are created, for example, by adding noise to human-recognizable sample data, such as images, so that human recognition and model-based determination are inconsistent.

PRIOR ART DOCUMENTS

Patent Documents

Patent Document 1: International Publication No. WO 2020/084683

SUMMARY OF THE INVENTION

Problems to be Solved by the Invention

Assuming that a plurality of persons are successfully authenticated using the same adversarial example, it is conceivable that there will be more cases of fraudulent use than cases of only one person getting successfully authenticated, resulting in a greater impact in this respect. If an adversarial example for which authentication is successful for a plurality of persons can be obtained, it is possible to take countermeasures such as constructing a model that is less likely to be deceived by the adversarial example.

An example object of the present invention is to provide an information processing device, an information processing method, and a recording medium capable of solving the problems mentioned above.

Means for Solving the Problem

According to a first example aspect of the present invention, an information processing device includes: a guide data acquisition means that acquires biometric information of a plurality of persons; and an adversarial example generation means that generates one adversarial example, using the biometric information of the plurality of persons.

According to a second example aspect of the present invention, an information processing method includes: acquiring biometric information of a plurality of persons; and generating one adversarial example, using the biometric information of the plurality of persons.

According to a third example aspect of the present invention, a recording medium has recorded therein a program causing a computer to execute: acquiring biometric information of a plurality of persons; and generating one adversarial example, using the biometric information of the plurality of persons.

Effect of Invention

According to the information processing device, the information processing method, and the recording medium mentioned above, it is expected that an adversarial example that is successful in authenticating a plurality of persons can be obtained.

EXAMPLE EMBODIMENT

Hereinafter, example embodiments of the present invention will be described, however, the present invention within the scope of the claims is not limited by the following example embodiments. Furthermore, all the combinations of features described in the example embodiments may not be essential for the solving means of the invention.

A case in which an adversarial example is used for face authentication will be described below as an example. Specifically, it is assumed that an authentication device (biometric authentication device) compares the feature of a face image of a person to be authenticated with the feature of a registered image that has been preliminarily registered, and determines both as being face images of the same person if the similarity in the features is equal to or greater than a predetermined value.

The registered image itself may be registered as image data, or the feature of the registered image may be registered. It is assumed that a registered image or its feature of each of a plurality of persons is registered, and a person whose registered image or its feature is registered is referred to as a registered person. The registered image is associated with identification information of the registered person.

A face image of a person to be authenticated is also referred to as an authentication target image.

Also, the degree of similarity used by this authentication device indicates a greater similarity as the degree of similarity is greater.

In this authentication device, if the similarity between the feature of the authentication target image and the feature of any of the registered images of the plurality of persons is equal to or greater than a predetermined value, authentication is successful for any of the registered images.

However, the biometric authentication of interest in the example embodiments is not limited to face authentication, and various types of biometric authentications capable of generating adversarial examples can be the biometric authentication of interest in the example embodiments.

First Example Embodiment

Figure 1:
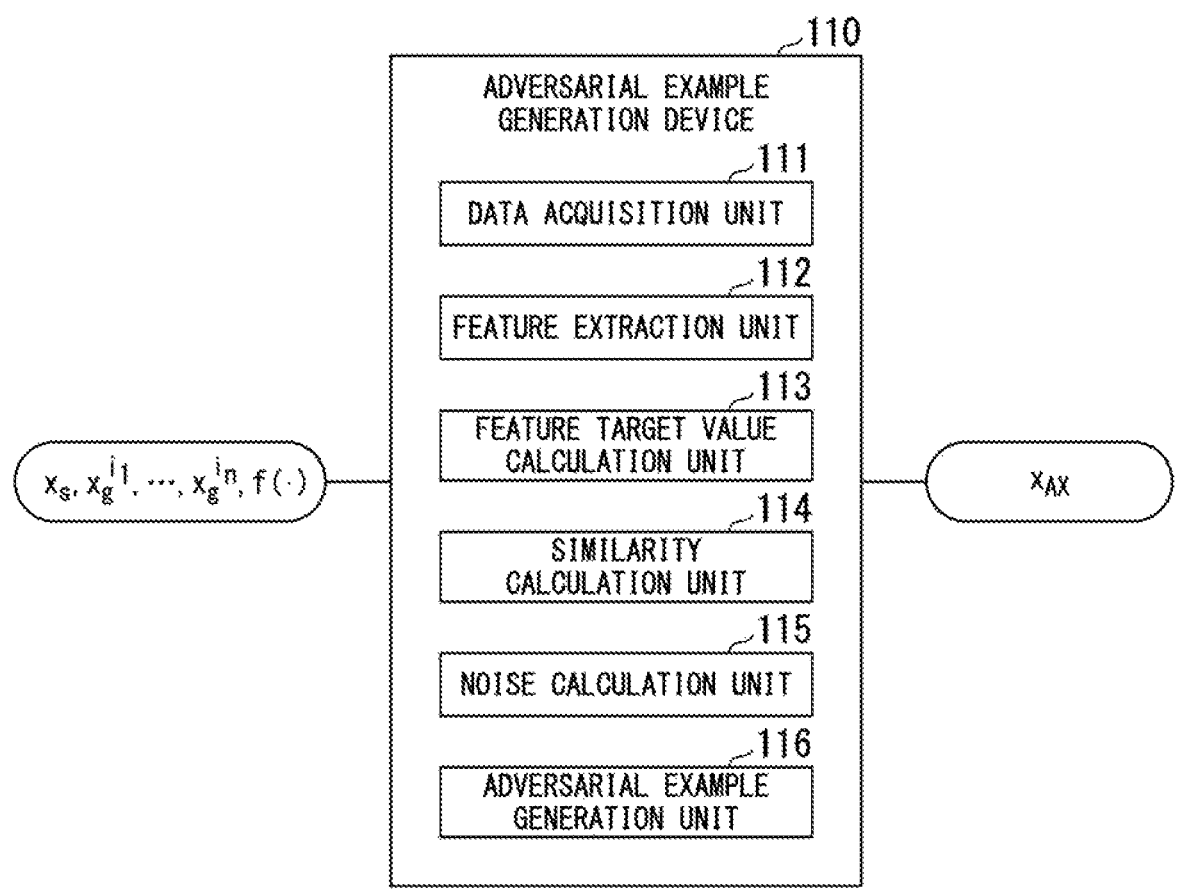
FIG. 1 A schematic block diagram showing a configuration example of an adversarial example generation device according to a first example embodiment.

FIG. 1 is a schematic block diagram showing a configuration example of an adversarial example generation device according to a first example embodiment. With the configuration shown in FIG. 1, an adversarial example generation device 110 includes a data acquisition unit 111, a feature extraction unit 112, a feature target value calculation unit 113, a similarity calculation unit 114, a noise calculation unit 115, and an adversarial example generation unit 116.

The adversarial example generation device 110 generates an adversarial example that has a relatively high probability of successful authentication for a plurality of registered persons. The adversarial example generation device 110 corresponds to an example of the information processing device.

If one adversarial example results in successful authentication for a plurality of persons, it is conceivable that there will be more cases of fraudulent use of the adversarial example than cases where authentication is successful for one registered person only.

For example, consider a case where the authentication device uses a face image of an identification document such as a passport or a driver's license as an authentication target image, and calculates the similarity between the feature of the authentication target image and the feature of the registered image. In such a case, it is conceivable that the person to be authenticated pretends to be another person by presenting another person's identification document to the authentication device. The person who is being authenticated here is also referred to as an unauthorized user.

In the case where the issuer of an identification document, upon issuing the identification document, visually confirms whether the identity of the recipient thereof matches the identity indicated thereon, it is conceivable to use an adversarial example based on the source image of the person of the identification document, as the face image of the identification document. Specifically, a person of an identification document is collaborating on fraudulent use, and when the identification document is applied, an adversarial example is provided that succeeds in authenticating the fraudulent user in authentication performed by the authentication device while looking like the collaborating person when view by human eyes.

By using this adversarial example as the face image of the identification document, then in visual confirmation at the time of issuing the identification document, it is conceivable that the recipient thereof is recognized as the person whose identity is indicated on the identification document (collaborator), and that in face authentication using the identification document, authentication will succeed as a fraudulent user.

As a countermeasure against such fraud, it is conceivable to perform personal identification by face recognition in addition to visual confirmation when issuing an identification document. In the case where, as a result of the feature of the face image approaching the feature of the face image of the fraudulent user when generating an adversarial example, the feature of the obtained adversarial example differs from the feature of the face image of the collaborator, it is expected that face authentication of the person of the identification document (collaborator) fails in face authentication at the time of issuing the identification document, and the identification document will not be issued. These two features approaching to each other means that the degree of similarity increases between the two features.

On the other hand, in the case where an adversarial example for which the feature is similar to both the collaborator and the fraudulent user, is used for an identification document, it is conceivable that visual confirmation at the time of issuing the identification document, face recognition at the time of issuing the identification document, and face authentication of the fraudulent user using the identification document will all succeed. In such a case, impersonation of the fraudulent user cannot be prevented.

Therefore, the adversarial example generation device 110 generates an adversarial example for which the feature is similar to any of the face images of the plurality of persons. It is expected that it is possible to evaluate the risk of the authentication device with respect to an adversarial example for which the feature is similar to any of the face images of the plurality of persons, using the adversarial example generated by the adversarial example generation device 110. It is also expected that it is possible to train an authentication model that is unlikely to be deceived by the adversarial example for which the feature is similar to any of the face images of the plurality of persons (that is, robust), using the adversarial example generated by the adversarial example generation device 110.

Alternatively, consider a case where at the time of entry to a theme park, the authentication device authenticates the face image of an entry target person captured on site against the face image included in the period entry ticket, and entry is permitted upon successful authentication. In such a case, if an adversarial example whose feature is similar to that of any of the face images of a plurality of persons is used as the face image included in the period entry ticket, it is conceivable that the plurality of persons may share this period entry ticket to make a fraudulent entry.

It is expected that the adversarial example generation device 110 will generate an adversarial example whose feature is similar to that of any of the face images of the plurality of persons, thereby enabling countermeasures against such fraud. As described above, it is expected that it is possible to evaluate the risk of the authentication device with respect to an adversarial example for which the feature is similar to any of the face images of the plurality of persons, using the adversarial example generated by the adversarial example generation device 110. It is also expected that it is possible to train an authentication model that is unlikely to be deceived by the adversarial example for which the feature is similar to any of the face images of the plurality of persons, using the adversarial example generated by the adversarial example generation device 110.

The adversarial example generation device 110 may be configured, for example, with a computer such as a personal computer (PC) or a workstation (WS).

The data acquisition unit 111 acquires a face image of each of a plurality of persons as image data. The face image corresponds to an example of biometric information.

The face image acquired by the data acquisition unit 111 includes a source image and a guide image. The source image referred to here is a source image of an adversarial example. The guide image referred to here is an image that is referenced for determining what kind of processing to be performed as processing for generating an adversarial example.

The adversarial example generation device 110 processes the source image so that the similarity of the features with the sample image is increased, and generates an adversarial example. In particular, the adversarial example generation device 110 uses guide images of a plurality of persons to generate an adversarial example for which the feature has a relatively high similarity to that of any of the guide images of the plurality of persons.

The guide image corresponds to an example of guide data. The data acquisition unit 111 corresponds to an example of the guide data acquisition means.

The method by which the data acquisition unit 111 acquires a source image and the method by which it acquires a guide image may be the same method or may be different methods. For example, the data acquisition unit 111 may acquire both the source image and the guide image from a face image database device. Alternatively, the data acquisition unit 111 may capture the source image using a camera and acquire the guide image from the face image database device.

The feature extraction unit 112 calculates the feature of each piece of biometric information of a plurality of persons. In particular, the feature extraction unit 112 calculates the feature of each of a plurality of guide images and the feature of a source image or an adversarial example being generated. The source image and the adversarial example being generated are also collectively referred to as processing target images. Calculating a feature is also referred to as feature extraction.

The feature extraction unit 112 corresponds to an example of the feature extraction means.

The feature calculated by the feature extraction unit 112 may be the same as the feature calculated from biometric information by the authentication device to which an adversarial example is supposed to be applied. However, it is not limited to this example. As the feature calculated by the feature extraction unit 112, various features that enable calculation of the degree of similarity between two features can be used. For example, as the feature calculated by the feature extraction unit 112, various features represented by real vectors can be used.

Here, consider a case where the method for feature calculation used by the authentication device is known, such as when the designer of the authentication device uses the adversarial example generation device 110 for evaluation or training of the authentication device. In such a case, it is preferable that there be a positive correlation between the feature similarity calculated by the feature extraction unit 112 for each of two pieces of biometric information and the feature similarity calculated by the authentication device for each of the same two pieces of biometric information.

For example, in the case where the authentication device uses a neural network such as deep learning to calculate the feature, the feature extraction unit 112 may calculate the feature using a neural network similar to that of the authentication device. Alternatively, the feature extraction unit may use, as the feature, a value corresponding to the output of the hidden layer (intermediate layer) of the neural network used by the authentication device.

The feature target value calculation unit 113 calculates a target value of a feature, based on the feature of each guide image of a plurality of persons. For example, the feature target value calculation unit 113 calculates the average value of the feature of each guide image of a plurality of persons as the target value of the feature. The feature target value calculation unit 113 corresponds to an example of a feature target value calculation means.

The adversarial example generation device 110 performs processing on a processing target image so that the feature of the processed image has a higher degree of similarity with the feature target value than the feature of the image before processing.

When the number of guide images is two, the adversarial example generated by the adversarial example generation device 110 is represented as Equation (1).

[Math. 1]

$$x_{AX} = x_s^A + \alpha \nabla \text{SIM}\left( f(x_s^A), \frac{f(x_g^B) + f(x_g^A)}{2} \right) \quad (1)$$

$x_{AX}$ indicates an adversarial example. $x_s^A$ indicates a source image. The superscript "A" in $x_s^A$ indicates identification information of a registered person. That is to say, the superscript "A" of $x_s^A$ indicates that this source image is a face image of a registered person identified by identification information A.

Both $x_g^B$ and $x_g^A$ indicate guide images. The superscript "B" of $x_g^B$ and the superscript "A" of $x_g^A$ both indicate identification information of the registered person. That is to say, the superscript B" in $x_g^B$ indicates that this guide image is a face image of a registered person identified by identification information B. The superscript "A" of $x_g^A$ indicates that this guide image is a face image of a registered person identified by identification information A.

$\alpha$ is a coefficient for adjusting the magnitude of adversarial perturbation added to a processing target image. The value of $\alpha$ may be positive or negative. An example of making the value of $\alpha$ a negative value includes generating an adversarial example that fails to authenticate the person in the guide image.

f indicates a function for calculating the feature of an input face image. The feature used by the adversarial example generation device 110 (that is to say, the feature calculated by the feature extraction unit 112) may be represented in a real vector as described above.

SIM denotes a function that calculates the degree of similarity between two vectors. The degree of similarity here is not limited to a specific one, and various degrees of similarity can be used in which the more similar the two vectors, the greater the value. For example, cosine similarity may be used as SIM. Alternatively, an inverse of Euclidean distance may be used as SIM.

$\nabla$SIM shows a minute increase in the direction of greater similarity. Equation (1) indicates that the adversarial example $x_{AX}$ is generated by adding a minute quantity in the direction of highest similarity to the source image $x_s^A$, from the similarity between the feature of the source image $x_s^A$ and the sum of the average of the feature of the guide image $x_g^B$ and the feature of the guide image $x_g^A$. That is to say, the adversarial example generation device 110 processes the processing target image in the gradient direction in which the similarity between the average value of the features of two guide images and the feature of the processing target image increases.

Equation (1) is extended to Equation (2) when the number of guide images is not limited to two and is plural.

[Math. 2]

$$x_{AX} = x_s^A + \alpha \nabla \text{SIM}\left(f(x_s^A), \frac{\sum_{ID \in G} f(x_g^{ID})}{|G|}\right) \quad (2)$$

In Equation (2), the fraction "$(f(x_g^B)+f(x_g^A))/2$" in Equation (1) is replaced with "$\Sigma_{ID \in G} f(x_g^{ID})/|G|$". ID indicates the identification information of a registered person. G indicates a set of identification information of registered persons. "$\Sigma_{ID \in G} f(x_g^{ID})/|G|$" indicates the average of the feature $f(x_g^{ID})$ of the guide image for all the identification information of the registered persons included in the set G. Equation (2) indicates that the adversarial example $x_{AX}$ is generated by adding a minute quantity in the direction of highest similarity to the source image $x_s^A$, from the similarity between the feature of the source image $x_s^A$ and this average.

The adversarial example generation device 110 may repeatedly use Equation (2) to generate adversarial examples. In such a case, the adversarial example generation device 110 applies Equation (2) to the source image $x_s^A$ to generate the adversarial example $x_{AX}$, and thereafter it replaces the source image $x_s^A$ on the right side of Equation (2) with the obtained the adversarial example $x_{AX}$ and repeats application of Equation (2) once or more times. In such a case, $x_{AX}$ on the left side is replaced with the updated adversarial example $x_{AX}$.

However, the feature target value calculated by the feature target value calculation unit 113 is not limited to the average of the features of guide images. By performing processing to bring the feature of the processing target image closer to the feature target value, it is possible to use various feature target values such that the feature of the processing target image approaches the feature of any guide image.

For example, when the importance of each guide image is defined, based on this importance, the feature target value calculation unit 113 may calculate the weighted average of the feature of the guide image as the feature target value. Alternatively, the feature target value calculation unit 113 may calculate the feature target value such that the sum of the square of the Euclidean distance of the feature target value and the feature of each guide image for all guide images is minimized.

The similarity calculation unit 114 calculates the similarity between the features of two images. In particular, the similarity calculation unit 114 calculates the similarity between the similarity of the source image or the adversarial example being generated and the feature target value. In the Equation (1) or Equation (2) mentioned above, SIM corresponds to an example of the similarity calculated by the similarity calculation unit 114.

As described above, the degree of similarity here is not limited to a specific one, and various degrees of similarity can be used in which the more similar the two vectors, the greater the value. For example, a cosine similarity may be used as the similarity calculated by the similarity calculation unit 114. Alternatively, the inverse of the Euclidean distance may be used as the similarity calculated by the similarity calculation unit 114.

In the case where the similarity used by the authentication device is known, such as when the designer of the authentication device uses the adversarial example generation device 110 for evaluation or learning of the authentication device, it is preferable that the similarity calculation unit 114 be used.

The noise calculation unit 115 calculates adversarial perturbations. The adversarial perturbation referred to here is noise that is added as processing performed on a processing target image. That is to say, the adversarial perturbation here is the difference obtained by subtracting the pre-processing processing target image from the post-processing processing target image.

In the case of Equation (2), "$\nabla \text{SIM}(f(x_s^A), \Sigma_{ID \in G} f(x_g^{ID})/|G|)$" corresponds to an example of the adversarial perturbation.

The adversarial example generation unit 116 generates one adversarial example, using biometric information of a plurality of persons. In particular, the adversarial example generation unit 116 performs processing on the processing target image such that the feature of the post-processing image has a higher degree of similarity with the feature target value than the feature of the pre-processing image, to thereby generate an adversarial example. The processing target image corresponds to an example of the source biometric information of an adversarial example.

Specifically, the adversarial example generation unit 116 repeats, once or more times, the process of adding the adversarial perturbation generated by the noise calculation unit 115 to the processing target image, to generate an adversarial example.

The adversarial example generation unit 116 corresponds to an example of the adversarial example generation means.

Figure 2:
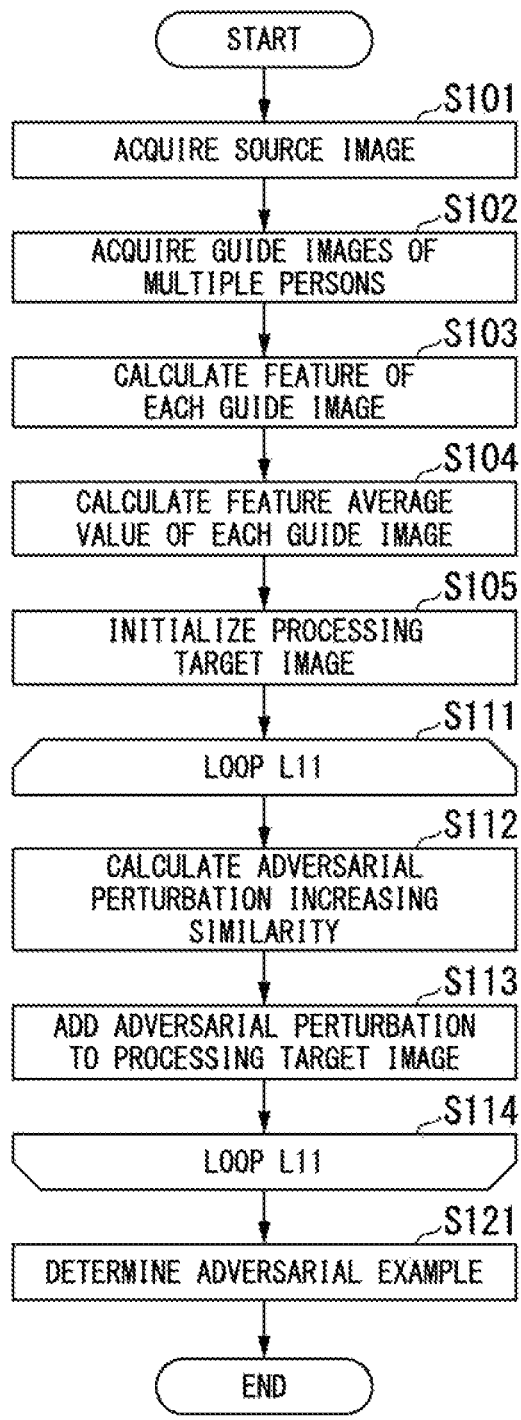
FIG. 2 A flowchart showing an example of a procedure of processing performed by the adversarial example generation device according to the first example embodiment.

FIG. 2 is a flowchart showing an example of a procedure of processing performed by the adversarial example generation device 110.

In the processing of FIG. 2, the data acquisition unit 111 acquires a source image (Step S101). The data acquisition unit 111 also acquires guide images of a plurality of registered person (Step S102).

Next, the feature extraction unit 112 calculates the feature of each guide image (Step S103). The feature target value calculation unit 113 calculates the average value of the feature of each guide image calculated by the feature extraction unit 112 (Step S104).

Also, the adversarial example generation unit 116 initializes the processing target image (Step S105). Specifically, the adversarial example generation unit 116 sets the source image as the initial value of the processing target image.

Next, the adversarial example generation device 110 starts a loop L11 for repeating the processing performed on the processing target image (Step S111).

In the process of the loop L11, the noise calculation unit 115 calculates an adversarial perturbation that causes the feature of the processing target image to approach the average value of the features of the guide images (Step S112).

For example, the noise calculation unit 115 calculates the direction in which the degree of similarity between the feature of the processing target image and the average value of the features of the guide images is maximized, for example, by differential calculation. The direction referred to here is a direction in a face image space. The face image space may be, for example, a space having a coordinate axis of each pixel of face image data and having a pixel value of each pixel as a coordinate value.

Then, the noise calculation unit 115 calculates a vector of a predetermined magnitude in the calculated direction, as an adversarial perturbation.

Next, the adversarial example generation unit 116 adds the adversarial perturbation calculated by the noise calculation unit 115 to the processing target image (Step S113).

Next, the adversarial example generation device 110 performs a termination process of the loop L11 (Step S114). Specifically, the adversarial example generation device 110 determines whether or not an end condition of the loop L11 is satisfied.

Various conditions can be employed as the end condition for the loop L11. For example, the end condition for the loop L11 may be a condition that the degree of similarity between the feature of the processing target image and the feature target value is greater than or equal to a predetermined value. Alternatively, the end condition for the loop L11 may be a condition that the number of execution repetitions of the loop L11 has reached a predetermined number.

If the end condition for the loop L11 is determined as not being satisfied, the adversarial example generation device 110 repeats the process of the loop L11.

On the other hand, if the end condition for the loop L11 is determined as being satisfied, the adversarial example generation device 110 ends the loop L11. In such a case, the processing proceeds to Step L121.

After the loop L11, the adversarial example generation unit 116 employs the obtained processing target image as an adversarial example (Step S121).

After Step S121, the adversarial example generation device 110 ends the processing of FIG. 2.

Figure 3:
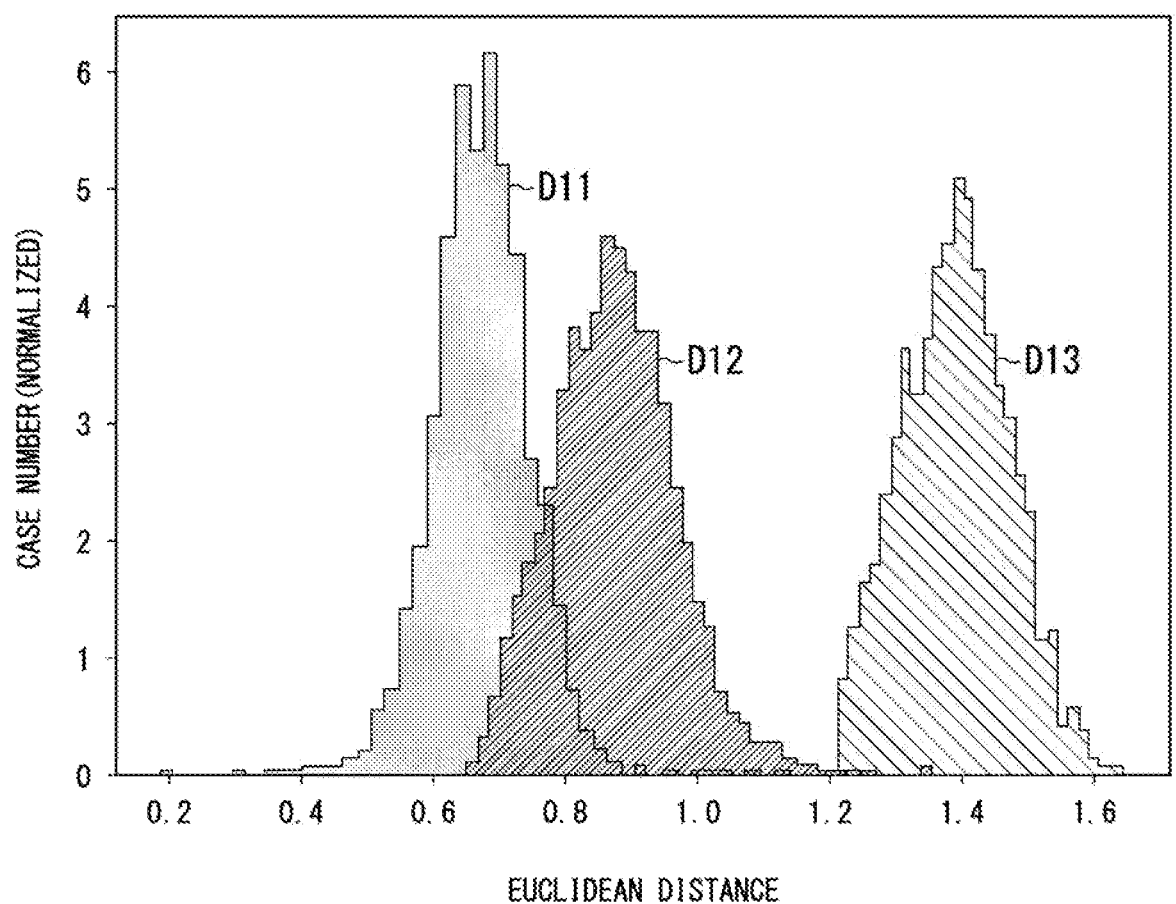
FIG. 3 A diagram showing an example of similarity between an adversarial example generated by the adversarial example generation device according to the first example embodiment and a registered image.

FIG. 3 is a diagram showing an example of similarity between an adversarial example generated by the adversarial example generation device 110 and a registered image. Combinations of the source image $x_s^A$ and the guide image $x_g^B$ are prepared, and when the source image $x_s^A$ is also used as a guide image to generate an adversarial example for each of the combinations, the similarities thereof are shown in FIG. 3.

That is to say, in the example of FIG. 3, through the process described above, the adversarial example generation device 110 generates an adversarial example $x_{AX}$ such that the feature $f(x_{AX})$ of the adversarial example $x_{AX}$ has a similarity with both the feature $f(x_s^A)$ of the source image $x_s^A$ and the feature $f(x_g^B)$ of the guide image $x_g^B$.

The horizontal axis of the graph in FIG. 3 represents the Euclidean distance between the features of two images. The closer the Euclidean distance (that is, the shorter the Euclidean distance), the higher the similarity between the features of the two images. The vertical axis of the graph in FIG. 3 represents the value obtained by normalizing the number of cases for each Euclidean distance.

A frequency distribution D11 indicates a frequency distribution of Euclidean distances between the feature $f(x_s^A)$ of the source image $x_s^A$ and the feature $f(x_g^B)$ of the guide image $x_g^B$. A frequency distribution D12 indicates a frequency distribution of the Euclidean distance between the feature $f(x_{AX})$ of the adversarial example $x_{AX}$ and the feature $f(x_s^A)$ of the source image $x_s^A$. A frequency distribution D13 indicates a frequency distribution of the Euclidean distance between the feature $f(x_{AX})$ of the adversarial example $x_{AX}$ and the feature $f(x_g^B)$ of the guide image $x_g^B$.

In the example of FIG. 3, the Euclidean distance between the feature $f(x_s^A)$ of the source image $x_s^A$ and the feature $f(x_g^B)$ of the guide image $x_g^B$, shown by the frequency distribution D11 is approximately greater than 1.2. On the other hand, the Euclidean distance between the feature $f(x_{AX})$ of the adversarial example $x_{AX}$ and the feature $f(x_s^A)$ of the source image $x_s^A$, shown by the frequency distribution D12 is approximately less than 1.2. The Euclidean distance between the feature $f(x_{AX})$ of the adversarial example $x_{AX}$ and the feature $f(x_g^B)$ of the source image $x_g^B$, shown by the frequency distribution D13 is approximately less than 1.2.

Now consider a case where the threshold for authentication performed by the authentication device is set to a similar threshold corresponding to the Euclidean distance of 1.2.

In such a case, it is considered that the source image $x_s^A$ cannot be used to impersonate the person of the guide image $x_g^B$ (authentication fails). It is also considered impossible to impersonate the person of the source image $x_s^A$, using the guide image $x_g^B$.

Therefore, regardless of whether the source image $x_s^A$ or the guide image $x_g^B$ is used, successful authentication will not be achieved in authenticating the person of the source image $x_s^A$ nor in authenticating the person of the guide image $x_g^B$.

On the other hand, when the adversarial example $x_{AX}$ is used, it is considered that authentication will succeed in both authenticating the person of the source image $x_s^A$ and authenticating the person of the guide image $x_g^B$. Then, it is conceivable that fraud such as impersonation using an identification document described above will succeed.

Therefore, using an adversarial example generated by the adversarial example generation device 110, the countermeasures described above can be taken.

As described above, the data acquisition unit 111 acquires biometric information of a plurality of persons. The adversarial example generation unit 116 generates one adversarial example, using biometric information of a plurality of persons acquired by the data acquisition unit 111.

In this way, the adversarial example generation unit 116 generates one adversarial example, using biometric information of a plurality of persons, so that, according to the adversarial example generation device 110, it is expected that an adversarial example that enables successful authentication of a plurality of persons can be obtained.

It is expected that it is possible to evaluate the risk of the authentication device with respect to an adversarial example for which the feature is similar to any of the face images of the plurality of persons, using the adversarial example generated by the adversarial example generation device 110. It is also expected that it is possible to train an authentication model that is unlikely to be deceived by the adversarial example for which the feature is similar to any of the face images of the plurality of persons, using the adversarial example generated by the adversarial example generation device 110.

Moreover, the feature extraction unit 112 calculates the feature of each piece of biometric information of a plurality of persons. The feature target value calculation unit 113 calculates a feature target value, based on the feature of each piece of biometric information of a plurality of persons. The adversarial example generation unit 116 generates the adversarial example by performing processing on original biometric information of the adversarial example, such that a feature of post-processing biometric information has a higher degree of similarity to the feature target value than that of pre-processing biometric information.

In this way, the feature target value calculation unit 113 calculates the feature target value, so that the adversarial example that should be generated by the adversarial example generation unit 116 can be directed. In this respect, the adversarial example generation device 110 can generate an adversarial example more efficiently than ad-hoc methods, in which, for example, an adversarial example is randomly generated and it is determined whether or not the generated adversarial example satisfies the condition in terms of distance from guide data. In this way, since the adversarial example generation device 110 can efficiently generate an adversarial example, the possibility of generating a desired adversarial example is high, and the amount of time required to generate an adversarial example is expected to be short.

Moreover, the feature target value calculation unit 113 calculates the average value of the feature of each piece of biometric information of a plurality of persons, as the feature target value.

It is only required that the feature target value calculation unit 113 perform relatively simple processing of calculating the average value of the features, and in this respect, the processing load of the feature target value calculation unit 113 can be reduced.

Second Example Embodiment

In a second example embodiment, there is described a case where the adversarial example obtained in the first example embodiment is used to evaluate the risk of an authentication device (biometric authentication device).

Figure 4:
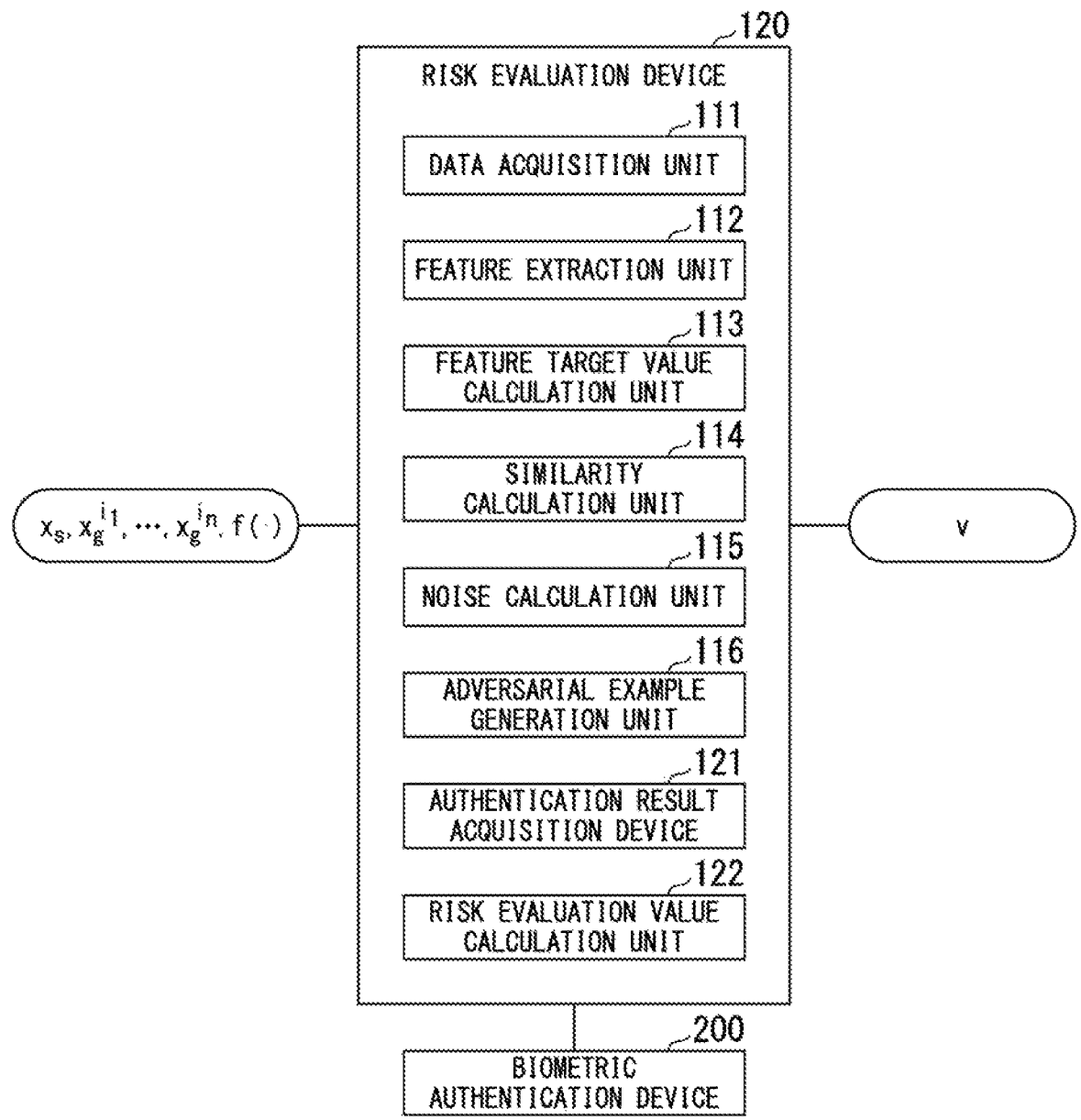
FIG. 4 A schematic block diagram showing a configuration example of a risk evaluation device according to a second example embodiment.

FIG. 4 is a schematic block diagram showing a configuration example of a risk evaluation device according to the second example embodiment. In the configuration shown in FIG. 4, a risk evaluation device 120 includes the data acquisition unit 111, the feature extraction unit 112, the feature target value calculation unit 113, the similarity calculation unit 114, the noise calculation unit 115, the adversarial example generation unit 116, an authentication result acquisition unit 121, and a risk evaluation value calculation unit 122.

The risk evaluation device 120 exchanges data with a biometric authentication device 200.

In the configuration of FIG. 4, portions having the same functions as those corresponding parts in FIG. 1 are given the same reference signs (111, 112, 113, 114, 115, 116), and detailed descriptions thereof are omitted.

The biometric authentication device 200 performs person authentication, using an input face image. Specifically, the biometric authentication device 200 compares the feature of an input face image with the feature of a registered image that has been preliminarily registered, and determines both as being face images of the same person if the similarity in the features is equal to or greater than a predetermined value.

The risk evaluation device 120 includes the biometric authentication device 200 and the authentication result acquisition unit 121 in addition to the units included in the adversarial example generation device 110 (FIG. 1). The risk evaluation device 120 is otherwise similar to the adversarial example generation device 110. The risk evaluation device 120 corresponds to an example of the information processing device.

The authentication result acquisition unit 121 compares the adversarial example generated by the adversarial example generation unit 116 with each of the registered image of the plurality of persons, and acquires the authentication result of face authentication using the adversarial example for each of the plurality of persons.

The authentication result acquisition unit 121 corresponds to an example of the authentication result acquisition means.

Specifically, the authentication result acquisition unit 121 outputs the adversarial example generated by the adversarial example generation unit 116 to the biometric authentication device 200. Then, the authentication result acquisition unit 121 causes the biometric authentication device 200 to perform face authentication using the adversarial example for each of the registered images of the plurality of persons. The authentication result acquisition unit 121 acquires the result of authentication performed by the biometric authentication device 200 for each of the registered images of the plurality of persons.

The risk evaluation value calculation unit 122 calculates a risk evaluation value of face authentication performed by the biometric authentication device 200, based on the result of authentication performed by the biometric authentication device 200. The risk evaluation value calculation unit 122 corresponds to an example of the risk evaluation value calculation means.

For example, the risk evaluation value calculation unit 122 calculates the risk in the case where the biometric authentication device 200 successfully authenticates a plurality of persons with the same adversarial example, to a risk higher than that in the case where at most only one person is successfully authenticated with the same adversarial example.

The risk evaluation value calculation unit 122 may also reflect, in the risk evaluation value, the authentication result as to whether the biometric authentication device 200 is authenticating correctly or erroneously. For example, among the cases in which the biometric authentication device 200 succeeds in authentication, in cases where the person in the source image, which is the original image of the adversarial example, has been successfully authenticated, the risk may be estimated lower by a predetermined value.

The risk evaluation value calculation unit 122 may reflect, in the risk evaluation value, the number of persons successfully authenticated by the biometric authentication device 200 using the same adversarial example. For example, the risk evaluation value calculation unit 122 may calculate the risk evaluation value by multiplying a predetermined constant by the number of persons for whom the biometric authentication device 200 has successfully authenticated using the same adversarial example. In such a case, the higher the risk evaluation value, the higher the risk.

Figure 5:
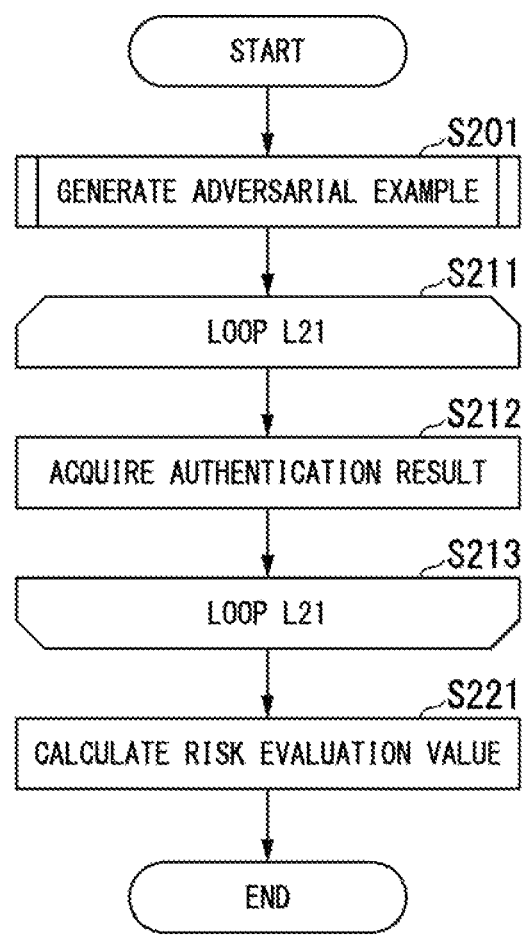
FIG. 5 A flowchart showing an example of a procedure of processing performed by the risk evaluation device according to the second example embodiment.

FIG. 5 is a flowchart showing an example of a procedure of processing performed by the risk evaluation device 120.

In the processing of FIG. 5, the risk evaluation device 120 performs the processing of FIG. 2 to generate an adversarial example (Step S201).

Next, the authentication result acquisition unit 121 starts a loop L21 for processing each registered person (Step S211).

In the process of the loop L21, the authentication result acquisition unit 121 outputs the adversarial example to the biometric authentication device 200, causes it to perform face authentication using the adversarial example for one registered person, and acquires the authentication result (Step S212).

Next, the authentication result acquisition unit 121 performs a termination process of the loop L21 (Step S213). Specifically, the authentication result acquisition unit 121 determines whether or not it has caused the biometric authentication device 200 to authenticate all of the registrants. If it is determined that there is a registered person on which the biometric authentication device 200 has not yet performed authentication, the authentication result acquisition unit 121 continues to perform the process of the loop L21 for the unprocessed registered person. On the other hand, if it is determined that it has caused the biometric authentication device 200 to authenticate all of the registered persons, the authentication result acquisition unit 121 ends the loop L21. In such a case, the processing proceeds to Step S221.

After the authentication result acquisition unit 121 has ended the loop L21, the risk evaluation value calculation unit 122 calculates the risk evaluation value for the authentication of the biometric authentication device 200 (Step S221).

As described above, the risk evaluation value calculation unit 122 calculates the risk in the case where the biometric authentication device 200 successfully authenticates a plurality of persons with the same adversarial example, to a risk higher than that in the case where at most only one person is successfully authenticated with the same adversarial example.

After Step S221, the risk evaluation device 120 ends the processing of FIG. 5.

As described above, the authentication result acquisition unit 121 acquires the authentication result of biometric authentication using the adversarial example regarding each of a plurality of persons, by comparing the adversarial example and each piece of biometric information for authenticating the plurality of persons. The risk evaluation value calculation unit 122 calculates the risk evaluation value of biometric authentication, based on the result of authentication performed by the biometric authentication device 200.

According to the risk evaluation device 120, the user can make reference to the risk evaluation value calculated by the risk evaluation value calculation unit 122 to examine whether or not a countermeasure is needed against fraud, using an adversarial example whose feature is similar to any of the biometric information of the plurality of persons. Alternatively, the risk evaluation device 120 may determine whether or not a countermeasure is needed.

If it is determined that a countermeasure is needed, the user may take a countermeasure such as using a biometric authentication device with a lower risk evaluation value. Alternatively, the user may take a countermeasure such as learning to reduce the risk of the biometric authentication device 200, using an adversarial example whose feature is similar to any of the biometric information of the plurality of persons. Alternatively, in addition to the authentication performed by the biometric authentication device 200, the user may take a manual countermeasure such as enhancing confirmation performed by a human. Here, the confirmation performed by a human is visual confirmation, for example, when biometric information is a face image.

Third Example Embodiment

In a third example embodiment, there is described a case where an authentication model is trained using an adversarial example obtained in the first example embodiment.

Figure 6:
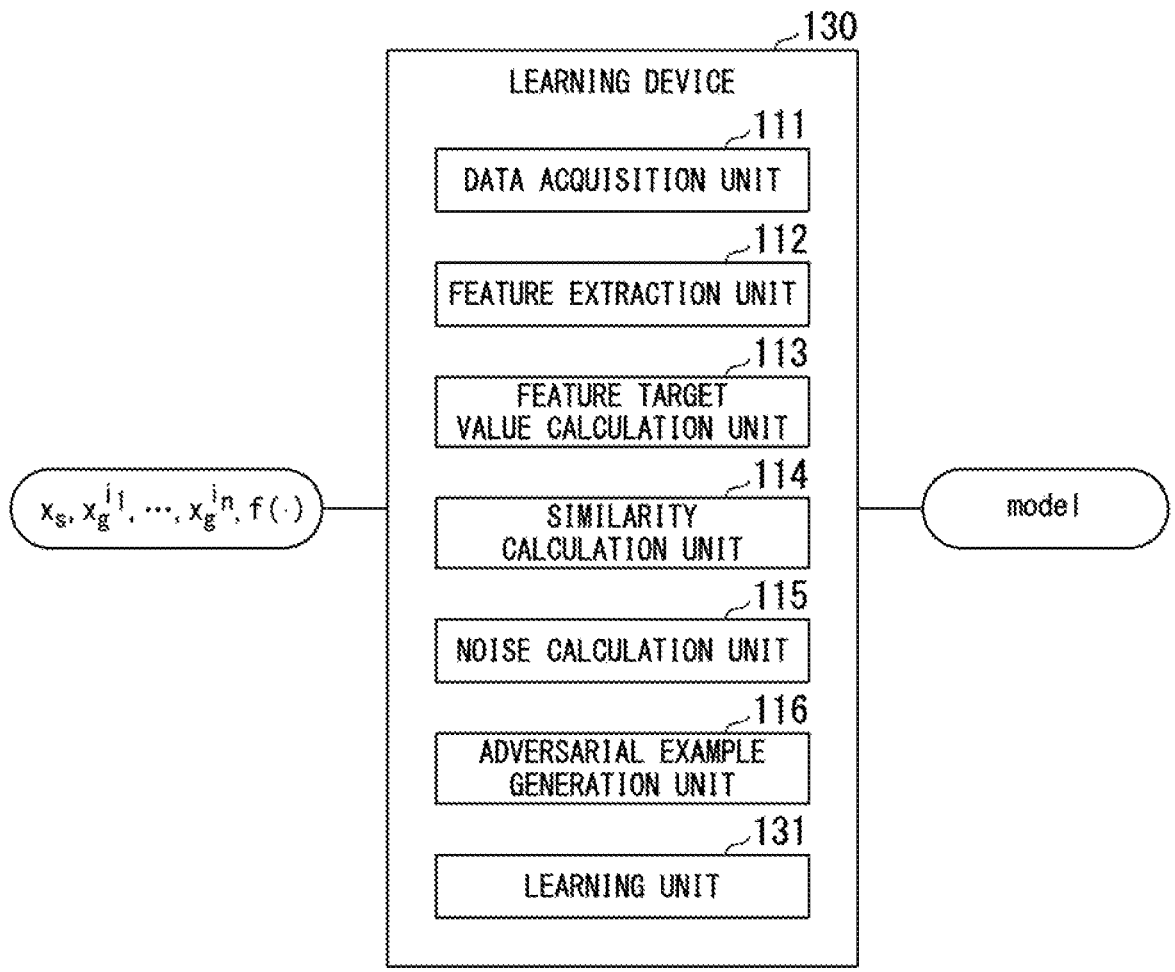
FIG. 6 A schematic block diagram showing a configuration example of a learning device according to a third example embodiment.

FIG. 6 is a schematic block diagram showing a configuration example of a learning device according to the third example embodiment. With the configuration shown in FIG. 6, a learning device 130 includes the data acquisition unit 111, the feature extraction unit 112, the feature target value calculation unit 113, the similarity calculation unit 114, the noise calculation unit 115, the adversarial example generation unit 116, and a learning unit 131.

In the configuration of FIG. 6, portions having the same functions as those corresponding parts in FIG. 1 are given the same reference signs (111, 112, 113, 114, 115, 116), and detailed descriptions thereof are omitted.

The learning device 130 includes the learning unit 131 in addition to the units included in the adversarial example generation device 110 (FIG. 1). The learning device 130 is otherwise similar to the adversarial example generation device 110. The learning device 130 corresponds to an example of the information processing device.

The learning unit 131 uses an adversarial example generated by the adversarial example generation unit 116 to perform learning of biometric authentication. The learning unit 131 corresponds to an example of the learning means.

For example, the learning unit 131 may generate training data in which the adversarial example generated by the adversarial example generation unit 116 is labeled with the identification information of the registered person of the source image as true. Then, the learning unit 131 may train the biometric authentication device (biometric authentication model in particular), using the generated training data.

Figure 7:
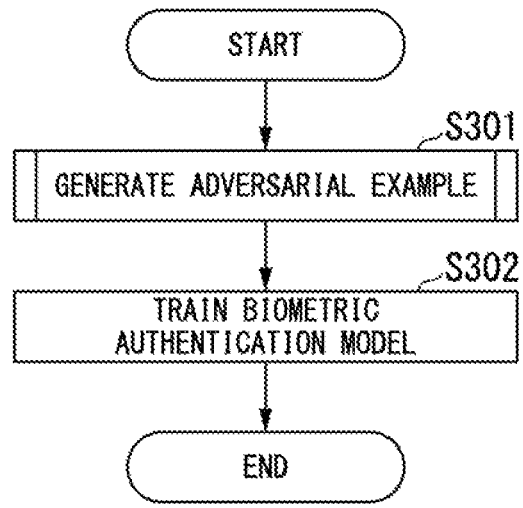
FIG. 7 A flowchart showing an example of a procedure of processing performed by the learning device according to the third example embodiment.

FIG. 7 is a flowchart showing an example of a procedure of processing performed by the learning device 130.

In the processing of FIG. 7, the learning device 130 performs the processing of FIG. 2 to generate an adversarial example (Step S301). The number of adversarial examples generated by the learning device 130 in Step S301 may be one or more, and is not limited to a particular number.

Next, the learning unit 131 uses the adversarial example obtained in Step S301 to train the biometric authentication model (Step S302).

After Step S302, the learning device 130 ends the processing of FIG. 7.

As described above, the learning unit 131 performs learning of biometric authentication, using an adversarial example whose feature is similar to any of the pieces of biometric information of a plurality of persons.

As a result, it is expected that it is possible to obtain a biometric authentication device that is unlikely to be deceived by an adversarial example whose feature is similar to any of the pieces of biometric information of a plurality of persons.

It should be noted that the second example embodiment and the third example embodiment may be implemented in combination with each other. For example, the risk evaluation device 120 according to the second example embodiment may further include the learning unit 131 (FIG. 6) in addition to the configuration of FIG. 4.

For example, as described above in relation to the second example embodiment, the learning unit 131 may execute learning when the risk evaluation value calculated by the risk evaluation value calculation unit 122 indicates a risk higher than a predetermined reference value.

Fourth Example Embodiment

Figure 8:
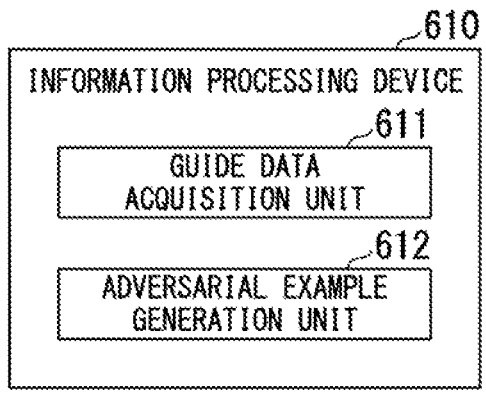
FIG. 8 A diagram showing a configuration example of an information processing device according to a fourth example embodiment.

FIG. 8 is a diagram showing a configuration example of an information processing device according to a fourth example embodiment. With the configuration shown in FIG. 8, an information processing device 610 includes a guide data acquisition unit 611 and an adversarial example generation unit 612.

With such a configuration, the guide data acquisition unit 611 acquires biometric information of a plurality of persons. The adversarial example generation unit 612 generates one adversarial example, using biometric information of a plurality of persons.

In this way, the adversarial example generation unit 612 generates one adversarial example, using biometric information of a plurality of persons, so that, according to the information processing device 610, it is expected that an adversarial example that enables successful authentication of a plurality of persons can be obtained.

It is expected that it is possible to evaluate the risk of the authentication device with respect to an adversarial example for which the feature is similar to any of the face images of the plurality of persons, using the adversarial example generated by the information processing device 610. It is also expected that it is possible to train an authentication model that is unlikely to be deceived by the adversarial example for which the feature is similar to any of the face images of the plurality of persons, using the adversarial example generated by the information processing device 610.

Fifth Example Embodiment

Figure 9:
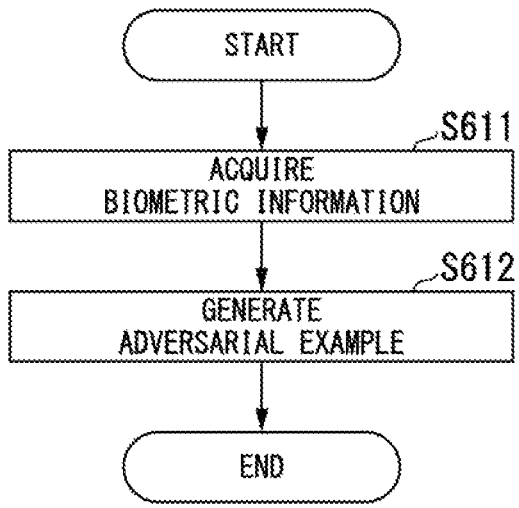
FIG. 9 A diagram showing an example of a processing procedure in an information processing method according to a fifth example embodiment.

FIG. 9 is a diagram showing an example of a processing procedure in an information processing method according to a fifth example embodiment. The information processing method shown in FIG. 9 includes acquiring biometric information (Step S611) and generating an adversarial example (Step S612).

In acquiring biometric information (Step S611), biometric information of a plurality of persons are acquired. In generating an adversarial example (Step S612), one adversarial example is generated, using the biometric information of a plurality of persons.

In this way, one adversarial example is generated using biometric information of a plurality of persons, so that, according to the information processing method shown in FIG. 9, it is expected that an adversarial example that enables successful authentication of a plurality of persons can be obtained.

It is expected that it is possible to evaluate the risk of the authentication device with respect to an adversarial example for which the feature is similar to any of the face images of the plurality of persons, using the adversarial example obtained through the information processing method shown in FIG. 9. It is also expected that it is possible to train an authentication model that is unlikely to be deceived by the adversarial example for which the feature is similar to any of the face images of the plurality of persons, using the adversarial example obtained through the information processing method shown in FIG. 9.

Figure 10:
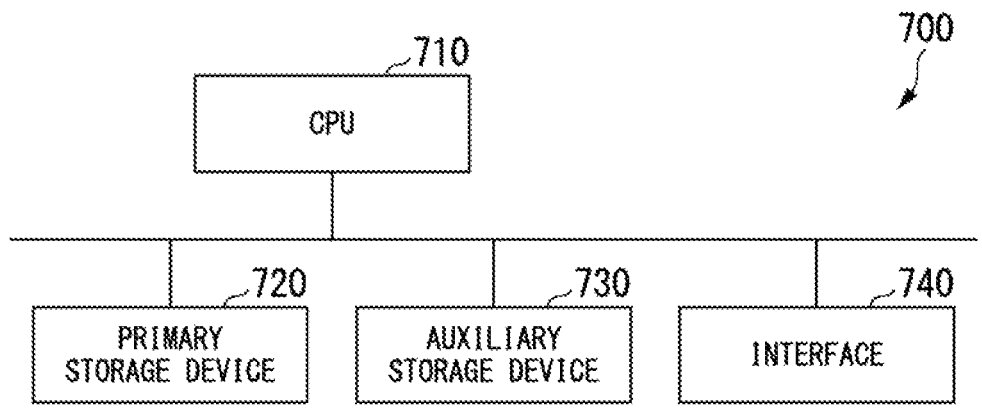
FIG. 10 A schematic block diagram showing a configuration of a computer according to at least one example embodiment.

FIG. 10 is a schematic block diagram showing a configuration of a computer according to at least one example embodiments.

In the configuration shown in FIG. 10, a computer 700 includes a CPU 710, a primary storage device 720, an auxiliary storage device 730, and an interface 740.

Any one or more of the adversarial example generation device 110, the risk evaluation device 120, the learning device 130, and the information processing device 610, or a portion thereof, may be implemented in the computer 700. In such a case, operations of the respective processing units described above are stored in the auxiliary storage device 730 in the form of a program. The CPU 710 reads out the program from the auxiliary storage device 730, loads it on the primary storage device 720, and executes the processing described above according to the program. Also, the CPU 710 reserves a storage region in the primary storage device 720 for the above processing, according to the program. Communication between each device and other devices is executed by the interface 740 having a communication function and communicating under the control of the CPU 710.

In the case where the adversarial example generation device 110 is implemented in the computer 700, operations of the data acquisition unit 111, the feature extraction unit 112, the feature target value calculation unit 113, the similarity calculation unit 114, the noise calculation unit 115, and the adversarial example generation unit 116 are stored in auxiliary storage device 730 in the form of a program. The CPU 710 reads out the program from the auxiliary storage device 730, loads it on the primary storage device 720, and executes the processing described above, according to the program.

Also, the CPU 710 reserves a storage region in the primary storage device 720 for the processing to be performed by the adversarial example generation device 110, according to the program. Communication with another device performed by the adversarial example generation device 110 is executed by the interface 740 having a communication function and operating under the control of the CPU 710. Interaction between the adversarial example generation device 110 and a user is executed by the interface 740 having an input device and an output device, presenting information to the user through the output device under the control of the CPU 710, and accepting user operations through the input device.

In the case where the risk evaluation device 120 is implemented in the computer 700, operations of the data acquisition unit 111, the feature extraction unit 112, the feature target value calculation unit 113, the similarity calculation unit 114, the noise calculation unit 115, the adversarial example generation unit 116, the authentication result acquisition unit 121, and the risk evaluation value calculation unit 122 are stored in the auxiliary storage device 730, in the form of a program. The CPU 710 reads out the program from the auxiliary storage device 730, loads it on the primary storage device 720, and executes the processing described above according to the program.

Also, the CPU 710 reserves a storage region in the primary storage device 720 for the processing to be performed by the risk evaluation device 120, according to the program. Communication with another device performed by the risk evaluation device 120 is executed by the interface 740 having a communication function and operating under the control of the CPU 710. Interaction between the risk evaluation device 120 and a user is executed by the interface 740 having an input device and an output device, presenting information to the user through the output device under the control of the CPU 710, and accepting user operations through the input device.

In the case where the learning device 130 is implemented in the computer 700, operations of the data acquisition unit 111, the feature extraction unit 112, the feature target value calculation unit 113, the similarity calculation unit 114, the noise calculation unit 115, the adversarial example generation unit 116, and the learning unit 131 are stored in the auxiliary storage device 730 in the form of a program. The CPU 710 reads out the program from the auxiliary storage device 730, loads it on the primary storage device 720, and executes the processing described above according to the program.

Also, the CPU 710 secures a storage region in the primary storage device 720 for the processing to be performed by the learning device 130, according to the program. Communication with another device performed by the learning device 130 is executed by the interface 740 having a communication function and operating under the control of the CPU 710. Interaction between the learning device 130 and a user is executed by the interface 740 having an input device and an output device, presenting information to the user through the output device under the control of CPU 710, and accepting user operations through the input device.

In the case where the information processing device 610 is implemented in the computer 700, operations of the guide data acquisition unit 611 and the adversarial example generation unit 612 are stored in the form of a program in the auxiliary storage device 730. The CPU 710 reads out the program from the auxiliary storage device 730, loads it on the primary storage device 720, and executes the processing described above according to the program.

Also, the CPU 710 reserves a storage region in the primary storage device 720 for the processing to be performed by the information processing device 610 according to the program. Communication with another device performed by the information processing device 610 is executed by the interface 740 having a communication function and operating under the control of the CPU 710. Interaction between the information processing device 610 and a user is executed by the interface 740 having an input device and an output device, presenting information to the user through the output device under the control of CPU 710, and accepting user operations through the input device.

It should be noted that a program for executing some or all of the processes performed by the adversarial example generation device 110, the risk evaluation device 120, the learning device 130, and the information processing device 610 may be recorded on a computer-readable recording medium, and the program recorded on the recording medium may be read into and executed on a computer system, to thereby perform the processing of each unit. The "computer system" referred to here includes an operating system and hardware such as peripheral devices.

Moreover, the "computer-readable recording medium" referred to here refers to a portable medium such as a flexible disk, a magnetic optical disk, a ROM (Read Only Memory), and a CD-ROM (Compact Disc Read Only Memory), or a storage device such as a hard disk built in a computer system. The above program may be a program for realizing a part of the functions described above, and may be a program capable of realizing the functions described above in combination with a program already recorded in a computer system.

The example embodiments of the present invention have been described in detail with reference to the drawings. However, the specific configuration of the invention is not limited to the example embodiments, and may include designs and so forth that do not depart from the scope of the present invention.

INDUSTRIAL APPLICABILITY

The example embodiment of the present invention may be applied to an information processing device, an information processing method, and a recording medium.

DESCRIPTION OF REFERENCE SYMBOLS

110 Adversarial example generation device
111 Data acquisition unit
112 Feature extraction unit
113 Feature target value calculation unit
114 Similarity calculation unit
115 Noise calculation unit
116, 612 Adversarial example generation unit
120 Risk evaluation device
121 Authentication result acquisition unit
122 Risk evaluation value calculation unit
130 Learning device
131 Learning unit
200 Biometric authentication device
610 Information processing device
611 Guide data acquisition unit

What is claimed is:

1. An information processing device comprising:
a memory configured to store instructions; and
a processor configured to execute the instructions to:
for each person of a plurality of persons,
acquire biometric information;
calculate a feature of the biometric information;
generate an adversarial example by using the biometric information and performing processing on original biometric information of the adversarial example to generate post-processing biometric information, such that a feature of the post-processing biometric information has a higher degree of similarity to a feature target value than the original biometric information does; wherein the feature target value is calculated based on the feature of the biometric information of each person;
perform learning of a biometric authentication model, using the adversarial example for each person after the processing has been performed;
acquire biometric information of a target person; and
perform biometric authentication of the target person using the learned biometric authentication model,
wherein generation of the adversarial example for each person followed by learning the biometric authentication model using the adversarial example for each person after the processing improves accuracy of the learned biometric authentication model in performing the biometric authentication of the target person using the learned biometric authentication model.

2. The information processing device according to claim 1, wherein the processor is configured to execute the instructions to calculate an average value of the feature of the biometric information of each person, as the feature target value.

3. The information processing device according to claim 1, wherein the processor is configured to execute the instructions to:
calculate a risk evaluation value of the biometric authentication of the target person, based on a result of the biometric authentication.

4. An information processing method comprising:
for each person of a plurality of persons,
acquiring biometric information;
calculating a feature of the biometric information;
generating an adversarial example by using the biometric information and performing processing on original biometric information of the adversarial example to generate post-processing biometric information, such that a feature of the post-processing biometric information has a higher degree of similarity to a feature target value than the original biometric information does; wherein the feature target value is calculated based on the feature of the biometric information of each person;
performing learning of a biometric authentication model, using the adversarial example for each person after the processing has been performed;
acquiring biometric information of a target person; and performing biometric authentication of the target person using the learned biometric authentication model, wherein generation of the adversarial example for each person followed by learning the biometric authentication model using the adversarial example for each person after the processing improves accuracy of the learned biometric authentication model in performing the biometric authentication of the target person using the learned biometric authentication model.

5. A non-transitory recording medium having recorded therein a program causing a computer to execute:

for each person of a plurality of persons, acquiring biometric information;

calculating a feature of the biometric information;

generating an adversarial example by using the biometric information and performing processing on original biometric information of the adversarial example to generate post-processing biometric information, such that a feature of the post-processing biometric information has a higher degree of similarity to a feature target value than the original biometric information does; wherein the feature target value is calculated based on the feature of the biometric information of each person;

performing learning of a biometric authentication model, using the adversarial example for each person after the processing has been performed;

acquiring biometric information of a target person; and performing biometric authentication of the target person using the learned biometric authentication model, wherein generation of the adversarial example for each person followed by learning the biometric authentication model using the adversarial example for each person after the processing improves accuracy of the learned biometric authentication model in performing the biometric authentication of the target person using the learned biometric authentication model.

* * * * *